United States Patent [19]
Eberhard et al.

[11] 3,805,368
[45] Apr. 23, 1974

[54] BAROMETER CAPSULE AND METHOD OF MANUFACTURE

[75] Inventors: Heinz Eberhard, Kinnelon; Anton Menzer, Teaneck, both of N.J.

[73] Assignee: Springfield Instruments Company, Inc., Hackensack, N.J.

[22] Filed: June 27, 1972

[21] Appl. No.: 266,622

Related U.S. Application Data

[63] Continuation-in-part of Ser. No. 58,343, July 27, 1970, abandoned.

[52] U.S. Cl. .................................. 29/454, 73/410
[51] Int. Cl. ............................................. B23p 15/00
[58] Field of Search ...... 73/410, 386, 387; 156/305; 29/454; 92/34, 42

[56] References Cited
UNITED STATES PATENTS

| | | | |
|---|---|---|---|
| 2,756,777 | 7/1956 | Bourns et al. | 29/454 |
| 2,279,854 | 4/1942 | Whitney | 29/454 |
| 2,569,058 | 9/1951 | Hobbs | 29/454 |
| 3,352,211 | 11/1967 | Jorgensen et al. | 92/42 |

*Primary Examiner*—Donald O. Woodiel
*Attorney, Agent, or Firm*—Amster & Rothstein

[57] ABSTRACT

A barometer capsule and method of manufacture thereof including the manufacturing method for opposed capsule members, the assembly thereof with each other and with a calibration stud, and the evacuation of air in the space between the capsule members.

8 Claims, 9 Drawing Figures

BAROMETER CAPSULE AND METHOD OF MANUFACTURE

This application is a continuation-in-part of United States Patent application Ser. No. 58,343, filed July 27, 1970, now abandoned.

The present invention relates generally to pressure-responsive instruments, and in particular to an aneroid barometer capsule and a method of manufacture thereof.

In a typical instrument movement for an aneroid barometer or the like, there is provided a capsule or diaphragm which is pressure-responsive and is coupled through a motion-amplifying system to an indicator, usually a rotatable pointer moving over an appropriately calibrated dial face. Throughout the years, various instrument mechanisms of this general type have been suggested, but there is ever present the need for further simplification of such mechanisms and their manufacturing and assembling process to provide low cost instrument motions which are capable of manufacture on a mass production basis at relatively low unit cost.

More specifically, the diaphragm or capsule members comprising the capsule mechanism for such an instrument are usually spot-welded or soft-soldered to each other, necessitating relatively complex and expensive manufacturing techniques.

Yet another difficulty with conventional capsules or diaphragms and the methods for fabricating the same has been the difficulty in properly orienting the various parts of the capsules or diaphragms, for example, orienting the capsule members with each other and with the mounting stud which is often secured to one of the capsule members. Since proper orientation of the parts of the capsule or diaphragm are necessary for accurate operation of the pressure responsive instrument, the lack of obtaining a properly oriented diaphragm or capsule and/or the difficulty in obtaining the same is a significant problem in the art.

Accordingly, it is an object of the present invention to provide an improved and simplified method of manufacture and assembling procedure for a pressure-responsive instrument capsule, such as is commonly used in an aneroid barometer. Specifically, it is within the contemplation of the present invention to provide a method of manufacture and apparatus useful therein such that the capsule is capable of manufacture on a mass production basis at relatively low unit cost and which provides a capsule in which the various parts thereof are easily and properly oriented.

In accordance with one illustrative embodiment demonstrating objects and features of the present invention, there is provided a method of manufacture and an assembly procedure for a pressure-responsive instrument capsule. The capsule includes first and second circularly shaped capsule members, the first of which includes a centrally located nipple and concentric corrugations, peripherally surrounded by a generally upwardly and outwardly extending flange. The second member defines a central stud hole and a vacuum opening, proximate thereto. The second member further includes concentrix corrugations and a peripherally located horizontal flange insertable within the upwardly and outwardly extending flange of the first member. The method comprises the steps of forming two diaphragm or capsule members using conventional techniques by stamping from a suitable metallic alloy, heat treating the members to achieve a suitable hardness in a reducing atmosphere and assembling the members with each other. The capsule members are mated with the upwardly and outwardly extending flange of one of the members circumferentially engaging the horizontal flange of the other member thereby correctly orienting the capsule members. A vertically oriented, threaded, calibration stud is then placed partially through the stud hole located centrally of the second member, the stud hole correctly orienting the stud. The threaded stud includes an insertion limiting stud flange for seating the stud on the second member. The assembly, including the capsule members and the stud, is then placed into a fixture holding the members in firm contact. An epoxy adhesive is then applied to the periphery of the two capsule members and proximate the stud hole and the vacuum opening located adjacent to the stud hole in the second member. The fixture and capsule assembly are placed in an oven, the air between the members then being exhausted by means of a vacuum pump operating through the vacuum opening and the adhesive is thereafter set by turning on the oven heat.

In accordance with another embodiment demonstrating objects and features of the present invention, an alternative method of manufacture and assembly procedure for a pressure-responsive instrument capsule is provided. The capsule includes first and second circularly shaped capsule members, the first of which includes a centrally located nipple and concentric corrugations, peripherally surrounded by a generally upwardly and outwardly extending flange. The second member defines a central stud hole and further includes concentric corrugations and a peripherally located horizontal flange insertable within the upwardly and outwardly extending flange of the first member. The method comprises the steps of forming two diaphragm or capsule members using conventional techniques and assembling the members with each other. The capsule members are mated with the upwardly and outwardly extending flange of one of the members circumferentially engaging the horizontal flange of the other member thereby correctly orienting the capsule members. A vertically oriented, threaded calibration stud is then placed partially through the stud hole located centrally of the second member, the stud hole correctly orienting the stud. The threaded stud defines a central bore for evacuating the space between the capsule members and also includes an insertion limiting stud flange for seating the stud on the second member. The assembly, including the capsule members and the stud, is then placed into a fixture holding the members in firm contact and an epoxy adhesive is placed into the trough formed by the horizontal and upwardly and outwardly extending flanges of the capsule members. The epoxy adhesive is also applied to the stud flange and the capsule member. The assembly isplaced in an oven, curing the epoxy adhesive and providing a vacuum-tight seal between first and second capsule members at the circumferences thereof and between the stud and the second member at the stud flange. The assembly is then placed into a vacuum chamber and the air between the capsule members is evacuated through the bore of the stud, the bore of the stud being thereafter sealed by a solder-type sealant which is inserted into the bore.

The above brief description, as well as further objects, features, and advantages of the present invention, will be more fully understood by reference to the following detailed description of presently preferred, but nonetheless illustrative, embodiments in accordance with the present invention, when taken in conjunction with the accompanying drawings, wherein.

Figure 1:
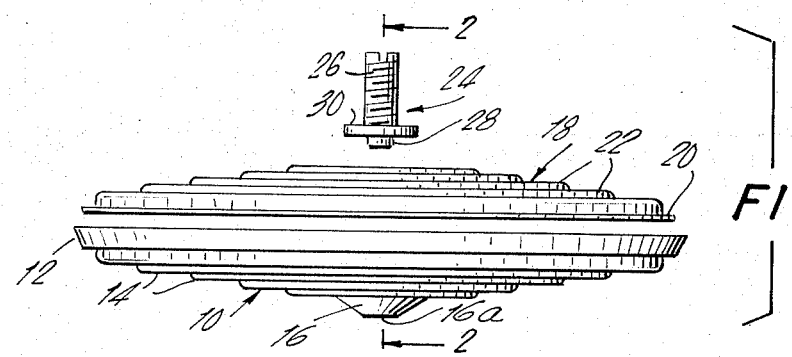
FIG. 1 is a front elevational view of the capsule members and stud of one embodiment of the present invention prior to assembly according to the manufacturing method of this embodiment of the present invention.

Referring to the drawings, there is shown a manufacturing method and assembly process for a pressure-responsive instrument capsule. The operating environment for the capsule is best described in United States patent application Ser. No. 46,326, filed June 15, 1970 for PRESSURE RESPONSIVE INSTRUMENT by Eberhard et al, now U.S. Pat. No. 3,631,723. In this patent, the pressure-responsive instrument is described as including a motion-transmitting mechanism including a readily calibrated capsule. The capsule is described as comprising a pair of capsule plates or members affixed at their perimeters and mounted such that at least one capsule member is movable in response to changes in the fluid pressure within the capsule. The motion of that member is transmitted to an indicator member by means of a motion-amplifying leverage system.

A capsule useful in the system described in the aforementioned United States patent is manufactured according to the following description of a manufacturing method and assembly process.

Figure 2:
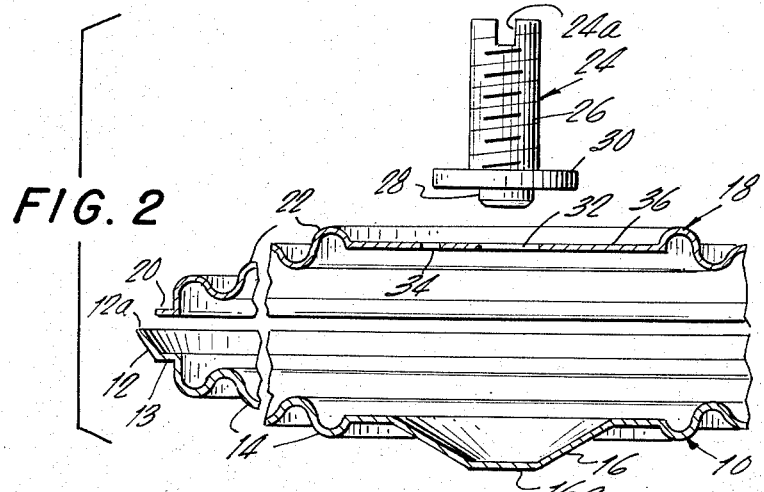
FIG. 2 is a partial, sectional view of the components of FIG. 1, taken along the line 2—2 thereof.

Referring particularly to FIGS. 1 and 2, capsule components according to this embodiment of the invention are shown as including a first capsule member, generally designated 10, which may be stamped from sheet stock such as 0.0045 inch metal alloy and then heat treated to a suitable hardness in a reducing atmosphere. The first capsule member is generally circular in shape including a peripherally located generally upwardly and outwardly extending flange 12 and having concentric corrugations 14 which are sinusoidal in cross-section (see FIG. 4). The first capsule member 10 is intended as the movable member in the aforementioned United States patent such that a motion-transmitting nipple 16 is integral and centrally located of the first capsule member 10 to protrude towards the motion-amplifying leverage system as noted above.

The capsule also includes a second capsule member, generally designated 18, comprising a metallic material as used in the other capsule member and shaped generally in a circular form to define a peripherally located horizontally extending flange 20 and concentric corrugations 22 which also are of sinusoidal cross-section. Corrugations 14, 22 are provided to give the capsule the spring constant required in the system.

Horizontally extending flange 20 is sized, relative to flange 12, to seat on a shoulder 13 which extends horizonally outwardly between the outermost corrugation 14 and flange 12 of the first capsule member. As will be explained hereinafter, this enables flange 12 to circumferentially engage flange 20 of the second capsule member thereby orienting the first and second capsule members with the cone-like angle of the outwardly and upwardly extending flange 12 guiding flange 20 into proper orientation during the assembly of the capsule.

A further capsule component is a capsule stud 24 comprising a threaded portion 26, a capsule insertion portion 28, with the two portions of the stud 26, 28 being separated by a stud flange 30. As described in the aforementioned patent, capsule stud 24 is for adjustable mounting the capsule on a base plate or the like to establish a fixed reference position for the pressure-responsive movement. It is therefore important that the longitudinal axis of stud 24 be in axial alignment with the center of motion transmitting nipple 16. In order to facilitate the assembly of the capsule stud 24 and the second capsule member 18, the second capsule member 18 (FIG. 2) is constructed to define a centrally located stud hole 32 and the diameter of the stud hole 32 is slightly larger than the diameter of stud portion 28 intended for insertion therein.

One end of threaded capsule stud 24 is provided with a transverse cut 24a to facilitate the insertion therein of a screwdriver blade, or the like, such that the flat top surface 16a defined by nipple 16 may be oriented at the requisite spacing from the capsule mounting base plate (not shown) to calibrate the instrument.

Another feature, primarily useful in the assembly process according to this embodiment of the present invention as described herein, is vacuum opening 34 defined by the second capsule member proximate the centrally located stud hole. The use of vacuum opening 34 will be apparent from the following detailed description of a manufacturing method and assembly process according to this embodiment of the present invention.

Initially, the first and second capsule members 10, 18, are placed into one another so that the horizontally extending flange 20 of the second capsule member 18 fits within the upwardly and outwardly extending flange 12 of the first capsule member. The conial-like or angular configuration of flange 12 guides the second capsule member into position and flange 20 seats on shoulder 13 of the first capsule member. The angular configuration of flange 12 further prevents flange 20 from resting on the upper lip 12a of flange 12.

Figure 3:
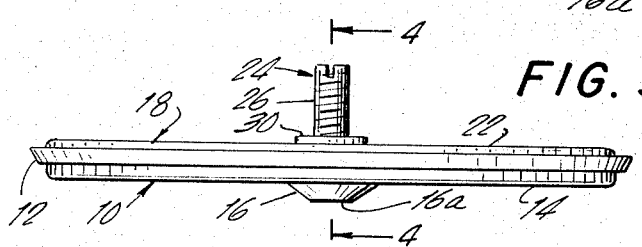
FIG. 3 is an elevational, assembled view of the components of FIGS. 1 and 2.
Figure 6:
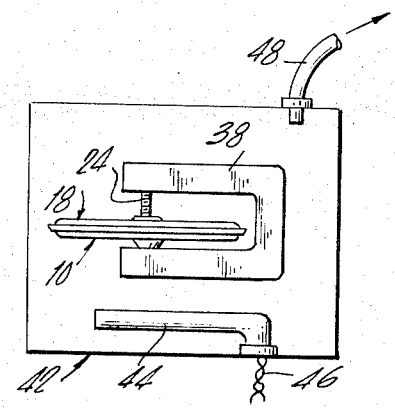
FIG. 6 is a front elevational schematic view of the assembly of FIGS. 4 and 5 as held in a suitable fixture in an oven according to this embodiment of the present invention.

The capsule stud 24 is then placed in a vertical orientation partially through the centrally located stud hole 32 of the second capsule member such that the stud portion 28 is inserted through the stud hole 32. The stud flange 30 functions as a stop for the insertion such that flange 30 rests on the outwardly facing surface 36 defined by the second capsule member. It may be seen, particularly from FIG. 4, that the flange 30 extends partially over the vacuum opening 34 for the capsule. At this point in the method, the assembly of the first and second capsule members 10, 18 and the threaded capsule stud 24 is as shown in FIG. 3. Such an assembly is then placed in a fixture 38 (FIG. 6) to hold the assembly in firm contact.

Figure 4:
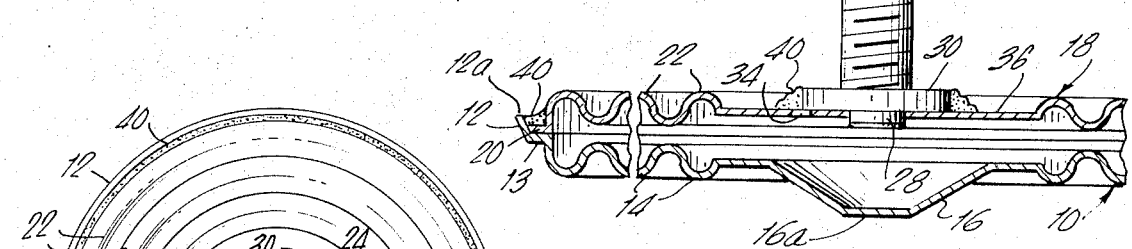
FIG. 4 is a partial elevational sectional view of the assembly of FIG. 3 taken along the line 4—4 thereof with a sealant applied thereto.
Figure 5:
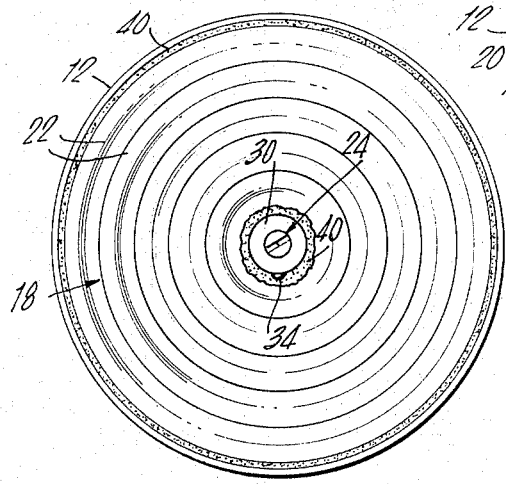
FIG. 5 is a top plan view of the assembly of FIG. 4.

A low viscosity sealant, such as epoxy adhesive 40, is thereafter applied to the assembly as shown particularly in FIGS. 4 and 5. Te epoxy adhesive, which may be of the type manufactured by Pittsburgh Plate Glass Company under the designated Bondmaster M773, may be applied by any convenient means such as extruding such an adhesive from a hypodermic-like syringe into the trough 15 of the first and second capsule members formed by their respective peripheral flanges 20, 12. The adhesive 40 is likewise applied at the junction of stud flange 30 and the exposed surface 36 of the second capsule member. It may be seen, particularly in FIG. 4, that the adhesive 40 is caused to flow over the vacuum opening 34 adjacent to the stud flange 30.

The fixture 38, which may be of the stack-tray type for mass production, supporting the first and second capsule members and the capsule stud 24, after the epoxy adhesive 40 or the like has been applied, is placed in an oven, generally designated 42, to complete the final steps of the method according to this embodiment of the invention. The oven 42 is intended both as a heating device and as an exhaust chamber for the capsule. Accordingly, the oven is shown schematically as including a heating element 44 connected to an appropriate power line 46 supplied by a power source (not shown). The oven 42 further includes a vacuum outlet means 48 for facilitating evacuation of the capsule assembly.

The air in the oven 42 is thereby exhausted by means of a vacuum pump or other conventional mechanisms through vacuum outlet 48. At this point in the method, the epoxy or other adhesive 40 is still sufficiently fluid to allow the air between capsule members 10, 18 to bubble out through the adhesive, displacing the adheisve until such time as the air is completely exhausted. At the point of complete evacuation of the chamber defined by the first and second capsule members, the oven heating element 44 is turned on to create a condition conducive to the setting of the adhesive. As an example, the heat may be maintained for approximately 15 or 20 minutes at a curing temperature of approximately 120° C.

Alternatively, the oven 42 may be constructed such that the heating element 44 is turned on automatically when the space between the first and second capsule members reaches a predetermined vacuum. Means for accomplishing such automatic procedures are readily available as part of the present state of the art. As an example, by the use of a low viscosity epoxy adhesive and an automatic heat control for the oven and the pressure diminution before turning the heat on, the resistance of the spring loaded peripheral portion of the capsule becomes greater than that of the vacuum opening 34 and a total evacuation is enabled by bubbling the last bit of air through that opening. As the heat is automatically turned on the epoxy initially becomes less viscous as it begins to cure and this further aids complete evacuation. The totally evacuated structure is represented by the capsule of FIG. 3 where the corrugations are flattened.

In order to facilitate a more complete understanding of the present invention, a summary of the method of manufacture and assembly process as above described according to this embodiment of the invention is as follows:

Initially, two capsule members are formed using conventional techniques of stamping from a suitable metallic alloy and then heat treating the capsule members to achieve a suitable hardness in a reducing atmosphere. The first and second capsule members are thereafter assembled by inserting the horizontally extending peripheral flange of one within the upwardly and outwardly extending peripheral flange of the other, the latter flange serving to guide the horizontal flange into its assembled position seated on the shoulder of the first capsule member. By closely holding the tolerances of manufacture of the two capsule members, the two capsule members are correctly oriented relative to each other by the engagement of the respective flanges at the shoulder of the first capsule member. A vertically oriented threaded stud is then placed partially through a stud hole located centrally of the second member. The threaded stud includes an insertion limiting stud flange 30 for seating the stud on the exposed surface of the second capsule member 18. By closely holding the tolerances of manufacture of the two capsule members and the threaded stud, the stud is accurately positioned in the stud hole relative to the capsule members and the stud is properly oriented and axially aligned with the motion transmitting nipple.

The assembly including first and second capsule members and the threaded capsule stud are then placed in a suitable fixture 38 to hold the capsule components in firm contact. An epoxy adhesive is then applied to the periphery of the two capsule members in the trough formed by the two circumferentially disposed flanges and proximate centrally of the second capsule member where the stud is inserted. The adhesive is caused to flow around the insertion limiting stud flange such that it covers the exposed part of the vacuum opening 34 not covered by the stud flange 30. The fixture holding the capsule assembly is then placed into an oven and exhaust chamber for evacuation of the space between the capsule members through the vacuum opening 34 and the still-fluid adhesive. At a particular point or degree of vacuum of the space between the capsule members, the oven is turned on such that the adhesive is set.

Figure 7:
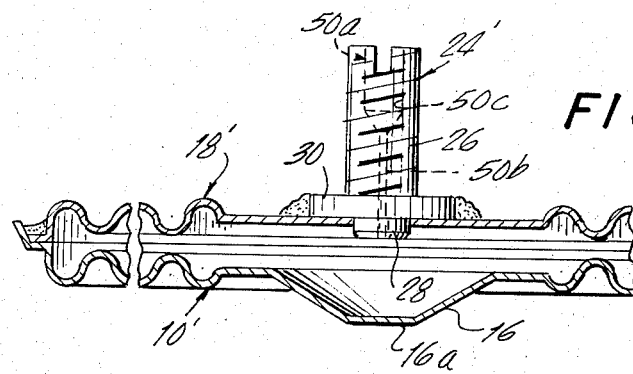
FIG. 7 is a partial elevational sectional view similar to that of FIG. 4 but showing capsule members and a stud according to an alternative embodiment of the present invention and which is assemblied to form a capsule mechanism according to the manufacturing method of this alternative embodiment.
Figure 8:
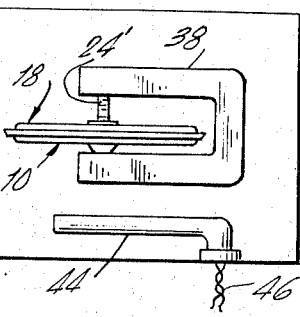
FIG. 8 is a front schematic view similar to FIG. 6 but showing the assembly of FIG. 7 in an oven according to the alternative embodiment of the present invention; and, FIG. 9 is a front schematic view showing the assembly of FIG. 7 in an evacuation and stud sealing chamber according to the alternative embodiment of the present invention.
Figure 9:
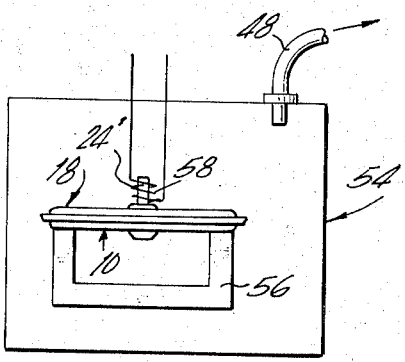

Referring now to FIGS. 7–9, a pressure responsive capsule mechanism and a method for fabricating the same according to an alternative embodiment of the present invention is shown as including first and second capsule members 10' and 18', respectively, and a capsule stud 24', First and second capsule members 10' and 18' are substantially identical to those hereinbefore described, the exception being that second capsule member 18' has been modified so as to eliminate vacuum opening 34 (compare FIGS. 4 and 7). Accordingly, no further discussion of the capsule members is necessary.

Stud 24' is also similar to stud 24 hereinbefore described and includes a threaded portion 26, a capsule insertion portion 28 and a stud flange 30. However, stud 24' has been modified to include a central evacuation passage, generally designated 50. Evacuation passage 50 includes a cylindrical bore 50a disposed near the top of stud 24', a cylindrical bore 50b of a smaller inner diameter than bore 50a disposed near the bottom of the stud and a chamferred intermediate bore 50c extending between bores 50a and 50b. It is through the central bore or vacuum passage 50 that the space between first and second capsule members 10' and 18' is evacuated.

The assembly sequence, according to this embodiment of the present invention, starts in much the same manner as that described hereinbefore. Initially, the first and second capsule members 10', 18', are placed into one another so that the horizontally extending flange 20 of the second capsule member 18 fits within the upwardly and outwardly extending flange 12 of the first capsule member. The angular configuration of flange 12 guides the second capsule member into position on shoulder 13 thereby properly and correctly orienting the two capsule members.

The capsule stud 24' is then placed in a vertical orientation partially through the centrally located study hole 32 of the second capsule member such that the stud position 28 is inserted through the stud hole 32. Due to the proper orientation between the first and second capsule members and, additionally, due to close manufacturing tolerances, stud 24' is properly oriented and held in axial alignment with the motion-transmitting nipple of the first capsule member.

In a similar manner to that described hereinbefore, the low viscosity epoxy adhesive 40 is inserted into trough 15 of the first and second capsule members formed by their respective peripheral flanges. The adhesive is likewise applied at the juncture of stud flange 30 and the exposed surface 36 of the second capsule member.

The assembly is then inserted into an oven, generally designated 52, similar to oven 42 hereinbefore described. However, oven 52 acts only as a heating device or curing chamber for the adhesive epoxy and, therefore, does not include a vacuum outlet means 48 (compare FIGS. 6 and 8). The assembly remains in the curing chamber 52 for a time sufficient to cure the adhesive epoxy 40, for example, for approximately 15 or 20 minutes at a curing temperature of approximately 120° C.

The as yet unevacuated capsule mechanism assembly, with the first and second capsule members secured to each other and the stud secured to the second capsule member, is then inserted into an evacuation chamber, generally designated 54, with the assembly resting on an appropriate supporting structure 56. The space between the first and second capsule members is then evacuated, by way of a vacuum pump or other conventional mechanism through vacuum outlet 48, the air between these capsule members being drawn out through the vacuum passageway 50 in stud 24'. The passageway is thereafter sealed in order to maintain the capsule in its evacuated condition.

By way of example, passageway 50 may be sealed by utilizing a slug of solder which is inserted into bore 50a prior to evacuation. The slug of solder does not interfere with the evacuation of the capsule. However, after evacuation has been completed, the solder is melted in order to seal the stud passageway. By way of example, the solder may be melted by using an induction coil, schematically designated 58, which is located around the stud in the vicinity of the slug of solder. After the air has been evacuated from the capsule chamber, the induction coil is actuated for a short period of time, in the order of a few seconds or the like. The slug of solder melts and flows partially down into bore 50b, thereby sealing the stud. It should be noted that bore 50b is of a size large enough to readily permit evacuation of the space between the capsule members but is yet small enough to prevent flow of solder into the capsule. As with the embodiment described hereinbefore, techniques well known in the art for automatically controlling the operation of oven 52 and evacuation chamber 54 may be employed.

Thus, a capsule for use in a pressure-responsive instrument or the like is provided in a simple, yet reliable and efficient manner. The assembly method enables low cost mass production and, additionally, provides a capsule having component parts which are properly oriented relative to each other, thereby insuring proper operation of the pressure-responsive instrument.

It is to be noted that certain technical liberties have been taken in the various figures. For example, in actual practice the capsule will remain in a "relaxed" condition, that is, with the respective corrugations of the capsule members each defining an arcuate surface until the capsule is evacuated. Once the capsule is evacuated, the capsule members "flaten out" and become parallel to each other. However, for purposes of simplicity, only FIGS. 1 and 2 show the capsule in the relaxed condition.

Obviously, other modifications of the present invention are possible in light of the above teaching. It is to be understood, therefore, that the embodiments described are merely examples of the application of the principles of the present invention. Additional embodiments may be devised by those skilled in the art without departing from the spirit or scope of the present invention.

What is claimed is:

1. A method for manufacturing a capsule mechanism for a pressure-responsive instrument including first and second capsule members and a calibration stud comprising the steps of forming said first capsule member with a generally upwardly and outwardly extending first flange at its periphery, forming said second capsule member with an outwardly extending second flange at its periphery, placing said first and second capsule members in contact with each other with said second flange within and adjacent to said first flange, inserting the calibration stud through a stud hole in the second capsule member and attaching said stud to said second capsule member, applying a sealant at the peripheries of said capsule members to seal said first and second flanges to each other, evacuating the space between said capsule members and sealing said capsule mechanism.

2. The invention according to claim 1 wherein said step of sealing said capsule mechanism includes curing the sealant by applying heat thereto at approximately 120° C.

3. The invention according to claim 1 wherein said step of placing said first and second capsule members in contact with each other includes properly orienting said capsule members wherein said first flange acts as guide for guiding said second flange into position.

4. The invention according to claim 1 wherein said evacuating step includes evacuating the space between said capsule members through a vacuum opening in said second capsule member.

5. The invention according to claim 1 wherein said evacuating step includes evacuating thespace between said capsule members through a vacuum passage disposed through said calibration stud.

6. The invention according to claim 5 wherein said step of sealing said capsule mechanism includes curing the sealant prior to said evacuation step and further includes sealing the vacuum passage of said calibration stud subsequent to said evacuation of said capsule members.

7. The invention according to claim 1 wherein the step of placing said first and second capsule members in contact with each other includes forming an annular trough at the peripheries of said capsule members adapted to hold sealant applied thereto.

8. A method for manufacturing a capsule mechanism for a pressure-responsive instrument including first and second capsule members and a calibration stud comprising the steps of placing the first and second capsule members in contact with each other, inserting the calibration stud through a stud hole in the second capsule member, applying a sealant at the peripheries of said capsule members at the junction of said stud and said stud hole, curing the sealant, placing a sealant in a stepped vacuum passage disposed through said calibration stud, placing the capsule mechanism in an evacuation chamber and evacuating the space between said capsule members through the vacuum passage disposed through said calibration stud, and activating a heating coil within said evacuation chamber surrounding said calibration stud to melt the sealant in the vacuum passage and thereby seal the vacuum passage.

* * * * *